(12) United States Patent
Mast et al.

(10) Patent No.: US 9,636,878 B2
(45) Date of Patent: May 2, 2017

(54) MOLDING APPARATUS AND METHOD FOR APPLYING POSITIVE PRESSURE TO MOLDED CONTAINER

(71) Applicant: Amcor Limited, Hawthorn, Victoria (AU)

(72) Inventors: Luke A. Mast, Brooklyn, MI (US); Peter Bates, Chelsea, MI (US); Bradley Wilson, Manchester, MI (US)

(73) Assignee: Amcor Limited, Hawthorn (AU)

(*) Notice: Subject to any disclaimer, the term of this patent is extended or adjusted under 35 U.S.C. 154(b) by 312 days.

(21) Appl. No.: 14/364,079

(22) PCT Filed: Jan. 4, 2013

(86) PCT No.: PCT/US2013/020260
§ 371 (c)(1),
(2) Date: Jun. 10, 2014

(87) PCT Pub. No.: WO2013/103798
PCT Pub. Date: Jul. 11, 2013

(65) Prior Publication Data
US 2014/0306384 A1    Oct. 16, 2014

Related U.S. Application Data

(60) Provisional application No. 61/583,336, filed on Jan. 5, 2012.

(51) Int. Cl.
*B29D 22/00* (2006.01)
*B29C 49/00* (2006.01)
(Continued)

(52) U.S. Cl.
CPC ............ *B29D 22/003* (2013.01); *B29C 49/00* (2013.01); *B29C 49/185* (2013.01); *B29C 49/42* (2013.01); *B29C 49/44* (2013.01)

(58) Field of Classification Search
None
See application file for complete search history.

(56) References Cited

U.S. PATENT DOCUMENTS 5,352,402 A   10/1994  Orimoto et al.
5,445,515 A    8/1995  Orimoto et al.
(Continued)

FOREIGN PATENT DOCUMENTS

JP    2003-103609 A    4/2003
KR       100119008 B1  9/1997
(Continued)

OTHER PUBLICATIONS

International Search Report and Written Opinion for PCT/US2013/020260, mailed Jun. 27, 2013; ISA/KR.

*Primary Examiner* — Monica Huson
(74) *Attorney, Agent, or Firm* — Harness, Dickey & Pierce, PLC

(57) ABSTRACT

A method of forming a container includes blow molding a primary form of the container inside a primary mold. The primary form has an exterior surface. The method also includes applying a fluid to the exterior surface of the primary form to shrink the primary form and to form a shrunken form of the container. Furthermore, the method includes blow molding a secondary form of the container from the shrunken form inside a secondary mold.

16 Claims, 2 Drawing Sheets

Figure 1:
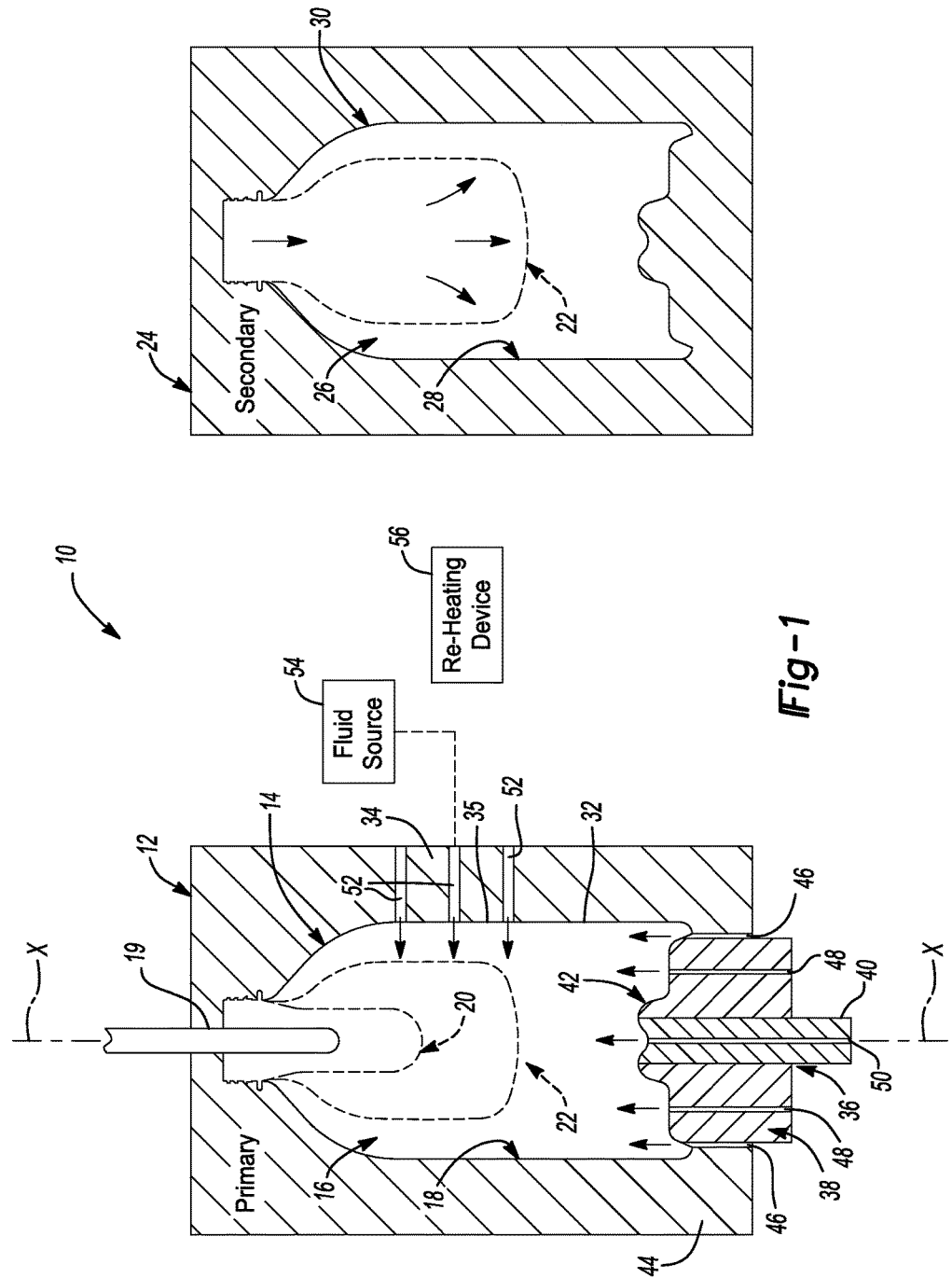

(51) Int. Cl.
*B29C 49/42* (2006.01)
*B29C 49/44* (2006.01)
*B29C 49/18* (2006.01)

(56) References Cited

U.S. PATENT DOCUMENTS

| | | | |
|---|---|---|---|
| 5,641,451 | A | 6/1997 | Orimoto et al. |
| 5,785,921 | A * | 7/1998 | Outreman ............... B29C 49/48 264/529 |
| 6,080,353 | A | 6/2000 | Tsuchiya |
| 7,485,251 | B2 | 2/2009 | Yaguchi et al. |
| 2004/0173950 | A1 | 9/2004 | Yaguchi et al. |

FOREIGN PATENT DOCUMENTS

| | | |
|---|---|---|
| KR | 100388363 B1 | 10/1998 |
| KR | 100884866 B1 | 2/2009 |

\* cited by examiner

MOLDING APPARATUS AND METHOD FOR APPLYING POSITIVE PRESSURE TO MOLDED CONTAINER

CROSS-REFERENCE TO RELATED APPLICATIONS

This application claims the benefit of U.S. Provisional Application No. 61/583,336, filed on Jan. 5, 2012. The entire disclosure of the above application is incorporated herein by reference.

FIELD

The present disclosure relates to a molding apparatus and, more particularly, relates to a molding apparatus and a corresponding method for applying positive pressure to a molded container.

BACKGROUND

This section provides background information related to the present disclosure which is not necessarily prior art.

As a result of environmental and other concerns, plastic containers (more specifically polyester and even more specifically polyethylene terephthalate (PET) containers) are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material, $\rho_a$ is the density of pure amorphous PET material (1.333 g/cc), and $\rho_c$ is the density of pure crystalline material (1.455 g/cc). Once a container has been blown, a commodity may be filled into the container.

In some cases, a container is formed in a plurality of blow molding steps. For instance, a primary form of the container is initially blow molded inside a primary mold, and then a secondary form of the container is subsequently blow molded inside a secondary mold. The size of the primary and secondary molds is controlled such that the primary form can fit inside the secondary mold. For instance, the cavity inside the primary mold is often approximately equal to the size of the cavity inside the secondary mold such that the secondary mold can accommodate the primary form of the container.

Also, the primary form of the container often shrinks slightly after being molded in the primary mold. The size of the primary and secondary molds can, thus, be further controlled to account for this shrink back of the primary form of the container. Also, in some embodiments, suction is applied inside the primary form after being formed in the primary mold to facilitate and control shrink back. Likewise, in some embodiments, the primary form is reheated after being blow molded in the primary mold to facilitate and control the amount of shrink back.

SUMMARY

This section provides a general summary of the disclosure, and is not a comprehensive disclosure of its full scope or all of its features.

A method of forming a container is disclosed. The method includes blow molding a primary form of the container inside a primary mold. The primary form has an exterior surface. The method also includes applying a fluid to the exterior surface of the primary form to shrink the primary form and to form a shrunken form of the container. Furthermore, the method includes blow molding a secondary form of the container from the shrunken form inside a secondary mold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
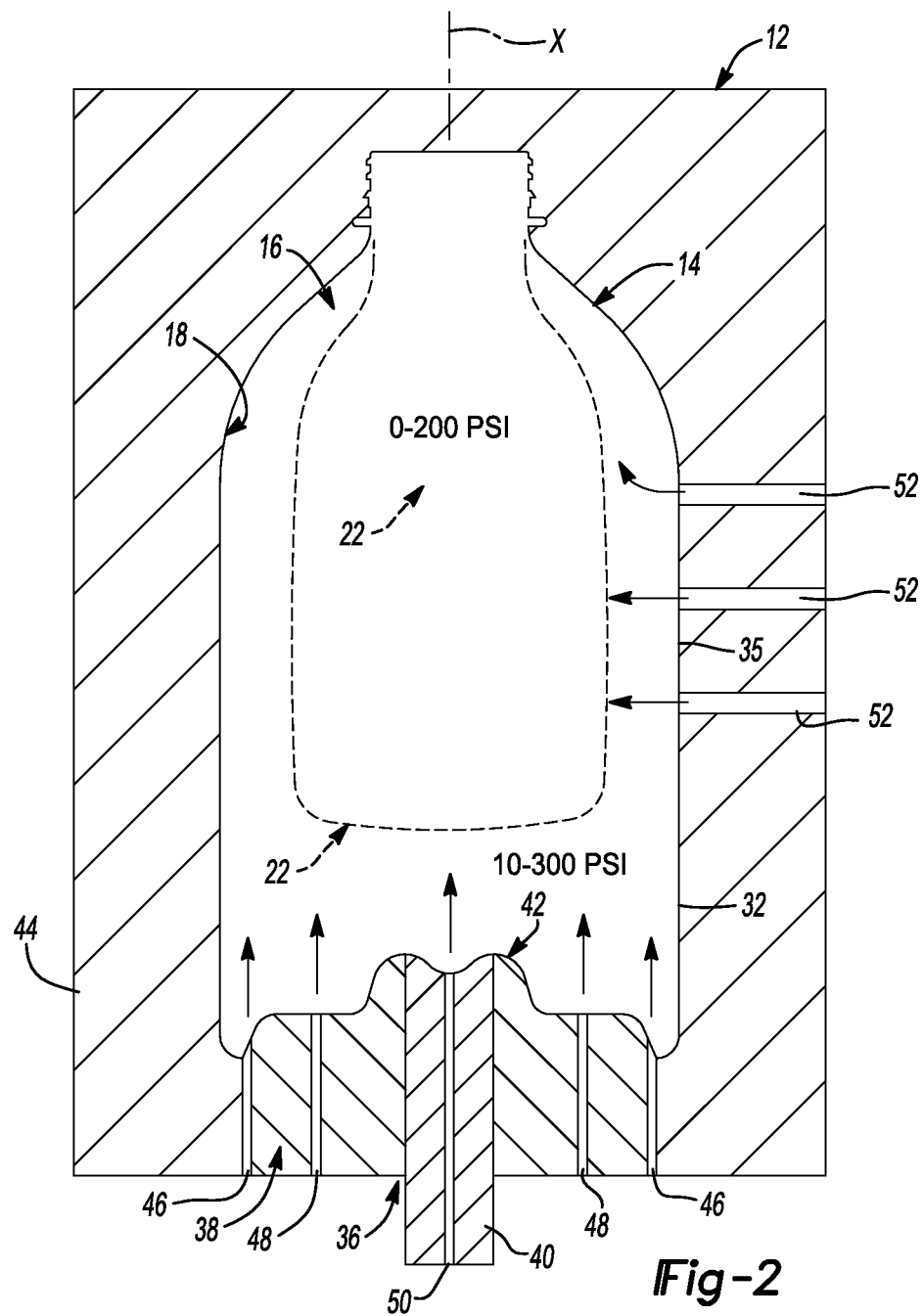

FIG. 1 is a schematic illustration of embodiments of a molding apparatus according to the teachings of the present disclosure; and FIG. 2 is a schematic sectional illustration of a primary mold of the molding apparatus of FIG. 1.

Corresponding reference numerals indicate corresponding parts throughout the several views of the drawings.

DETAILED DESCRIPTION

Example embodiments will now be described more fully with reference to the accompanying drawings.

Referring initially to FIG. 1 a molding apparatus 10 is schematically illustrated according to exemplary embodiments of the present teachings. As will be discussed, the apparatus 10 can be used to blow mold a container in a plurality of separate blow molds 12, 24.

Generally, the apparatus 10 can include a primary mold 12 in which a primary form 14 of a container can be formed. Specifically, the primary mold 12 can include an internal cavity 16 with internal surfaces 18, and the primary form 14 can be blow molded inside the cavity 16. For instance, a preform 20 (shown in phantom lines) can be positioned inside the cavity 16, and a blow pin 19 can introduce air or other fluid into the preform 20 at a predetermined pressure (e.g., between approximately 400 and 600 psi) to expand the preform 20 against the internal surfaces 18 and to form the primary form 14 of the container. The primary form 14 can include an exterior surface 32 (i.e., the surface that directly contacts the internal surfaces 18 of the primary mold 12).

As will be discussed, after the primary form 14 is blow molded, the primary form 14 can be shrunken in a controlled manner to create a shrunken form 22 (shown in phantom lines) from the primary form 14. Thus, as will be discussed, the container can be formed in a more efficient manner.

The apparatus 10 can also include a secondary mold 24 that includes an internal cavity 26 with internal surfaces 28. As will be discussed, the shrunken form 22 (shown in phantom lines) can be positioned within the internal cavity 26, and air or other fluid can be introduced into the shrunken form 22 at a predetermined pressure (e.g., between approximately 400 and 600 psi) to expand the shrunken form 22 against the internal surfaces 28 to create a secondary form 30 of the container.

In some embodiments, the secondary form 30 can have the dimensions and other characteristics of the final form of the desired container. However, it will be appreciated that the apparatus 10 can include additional molds that are used subsequent to the secondary mold 24 for blow molding the desired container from the secondary form 30.

Also, although the primary form 14 of the container is blow molded from the preform 20 in the embodiments discussed above, it will be appreciated that the primary form 14 can be made in any suitable manner (e.g., via extrusion blow molding, injection blow molding, stretch blow molding, etc.).

Referring now to FIGS. 1 and 2, the primary mold 12 and its method of use will now be discussed in greater detail. The internal surfaces 18 of the primary mold 12 can include a plurality of static portions 34 (i.e., surfaces that remain static during formation of the primary form 14). In the embodiments illustrated, the static portions 34 are used primarily for forming a sidewall 35 of the primary form 14. The internal surfaces 18 can also include one or more moveable portions 36 (i.e., surfaces that move during formation of the primary form 14). For instance, the movable portions 36 can include a pushup member 38 and/or a counter stretch rod 40. The counter stretch rod 40 can be substantially aligned with the longitudinal axis X of the cavity 16, and can be encircled by the pushup member 38. The pushup member 38 can also be centered on the axis X and can be encircled by a surrounding portion 44 of the mold 12.

In the embodiments illustrated, the pushup member 38 and counter stretch rod 40 can be used for forming a base 42 of the primary form 14 of the container. Specifically, the pushup member 38 can move vertically along the axis X relative to the surrounding portions 44 of the mold 12 to push upwards on the exterior surface 32 to form a portion of the base 42. Likewise, the counter stretch rod 40 can move vertically along the axis X relative to the pushup member 38 to push upwards on the exterior surface 32 and to form another portion of the base 42. The pushup member 38 and the counter stretch rod 40 can be actuated individually or together at any suitable time during formation of the primary form 14. It will be appreciated that the base 42 of the primary form 14 can be created using only the pushup member 38, only the counter stretch rod 40, both the pushup member 38 and counter stretch rod 40, or by any other suitable means.

In some embodiments, one or more first channels 52 can be defined through the static portions 34 of the primary mold 12. Also, one or more second channels 46 can be defined between the static portions 34 and the pushup member 38. Moreover, one or more third channels 48 can be defined solely within the pushup member 38. Still further, one or more fourth channels 50 can be defined solely within the counter stretch rod 40. It will be appreciated that there can be only one of the first, second, third, and fourth channels 46, 48, 50, 52, or any number/combination of the first, second, third, and fourth channels 46, 48, 50, 52 without departing from the scope of the present disclosure. Also, it will be appreciated that the channels 46, 48, 50, 52 can be routed in any suitable fashion and location within the mold 12. Furthermore, the channels 46, 48, 50, 52 can have any suitable shape, size, diameter, cross sectional area, etc. for controlling and optimizing the flow, temperature, and distribution of fluid exiting the channels 46, 48, 50, 52. Thus, as will be discussed, fluid from the channels 46, 48, 50, 52 can distribute positive pressure substantially evenly over substantially the entire exterior surface 32 of the primary form 14.

Each of the channels 46, 48, 50, 52 can be fluidly connected to a fluid source 54. The fluid source 54 can supply any fluid, such as a gas (e.g., air). The fluid can be heated to a predetermined temperature as well (e.g., from approximately 40 degrees to approximately 1000 degrees Fahrenheit). Thus, as will be discussed, fluid (e.g., heated air) can be supplied through the channels 46, 48, 50, 52 to the exterior surface 32 of the primary form 14 to thereby shrink the primary form 14 away from the internal surfaces 18 of the mold 12 to create the shrunken form 22 (shown in phantom). This can increase the efficiency of creating the container.

The fluid source 54 or another separate fluid source can also be operatively connected to the blow pin 19. Thus, the blow pin 19 can introduce fluid into the preform 20 for creating the primary form 14. Also, as will be discussed, the blow pin 19 can introduce fluid at a predetermined pressure (e.g., up to 200 psi) into the primary form 14 while the channels 46, 48, 50, 52 simultaneously supply fluid to the exterior surface 32 of the primary form 14 to thereby control the shrinkage of the primary form 14.

The apparatus 10 can further include a reheating device 56. The reheating device 56 can be of any suitable type. For instance, the reheating device 56 can be a heated oven that is separate from the primary mold 12 and the secondary mold 24. Thus, as will be discussed, the shrunken form 22 can be reheated by the reheating device 56 before being introduced into the secondary mold 24. Also, in some embodiments, the reheating device 56 can be a heating element for heating the primary mold 12 while the shrunken form 22 remains inside the primary mold 12.

Thus, methods of using the apparatus 10 will now be discussed. Initially, the preform 20 is provided. The preform 20 can be made out of any suitable material, such as a polymeric material (e.g., PET, etc.). The preform 20 can also be heated (e.g., inside an oven). Then, the preform 20 can be positioned inside the primary mold 12, and the blow pin 19 can introduce fluid into the preform 20 to blow mold the primary form 14. The fluid introduced into the preform 20 to blow mold the primary form 14 can be at any suitable pressure (e.g., between approximately 400 to 600 psi).

Next, the fluid source 54 can supply air or other fluid through one or more of the channels 46, 48, 50, 52 to the exterior surface 32 of the primary form 14 to thereby contract and shrink the primary form 14 away from the internal surfaces 18 of the primary mold 12 to thereby form the shrunken form 22. In some embodiments, positive pressure is distributed substantially evenly over the entirety of the exterior surface 32. The fluid from the channels 46, 48, 50, 52 can be supplied at any suitable pressure (e.g., between approximately 10 and 300 psi). The fluid supplied by the channels 46, 48, 50, 52 can be supplied at any suitable temperature (e.g., between approximately 40 and 1000 degrees F.). The temperature of the fluid can be adjusted to influence and control shrinkage and crystallinity.

Moreover, in some embodiments, the channels 46, 48, 50, 52 can supply fluid to the exterior surface 32 while the blow pin 19 coincidentally supplies fluid into the primary form 14 to thereby control shrinkage. The blow pin 19 can supply fluid at any suitable pressure (e.g., up to 200 psi) that is below the pressure applied to the exterior surface 32. The blow pin 19 can also supply fluid at any suitable temperature (e.g., between approximately 40 and 1000 degrees F.).

Then, in some embodiments, the shrunken form 22 can be cooled and stored. Subsequently, the shrunken form 22 can be reheated within the reheating device 56, and the shrunken form 22 can be placed inside the secondary mold 24 for subsequent blow molding. Also, in some embodiments, the shrunken form 22 can be removed from the primary mold 12 while still warm (i.e., without substantial cooling) and placed inside the secondary mold 24 for subsequent blow molding.

Accordingly, the primary form 14 can be shrunken in a controlled manner by applying positive pressure between the primary mold 12 and the exterior surface 32 of the primary form 14. Thus, the resulting shrunken form 22 may be substantially immediately ready for transfer into the secondary mold 24, or the shrunken form 22 may require less reheat time inside the reheating device 56 before entering the secondary mold 24. Also, the internal cavity 26 of the secondary mold 24 can be shaped substantially smaller than the internal cavity 16 of the primary mold 12, and yet the shrunken article 22 is likely to fit within the secondary mold 24, thereby facilitating mold design, etc. Accordingly, the apparatus 10 and its method of use can increase the efficiency of creating blow molded containers.

In the embodiments described above, positive pressure is applied to the primary form 14 while still in the primary mold 12. However, in other embodiments of the present disclosure, the primary form 14 is removed from the primary mold 12 before positive pressure is applied to the exterior surface 32 to shrink the primary form 14 into the shrunken form 22.

Furthermore, it will be appreciated that the fluid source 54 can apply gas or other fluid to the exterior surface 32 of the primary form 14 in a controlled manner (e.g., at a predetermined pressure, temperature, etc.). Thus, the amount of shrinkage and/or the rate of shrinkage can be controlled.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of forming a container comprising:
    blow molding a primary form of the container inside a primary mold, the primary form having an exterior surface;
    applying a fluid to the exterior surface of the primary form to shrink the primary form and to form a shrunken form of the container; and
    blow molding a secondary form of the container from the shrunken form inside a secondary mold;
    wherein applying the fluid occurs while the primary form is inside the primary mold.

2. The method of forming the container of claim 1, wherein applying the fluid includes providing a heated fluid, and wherein applying the fluid includes applying the heated fluid to the exterior surface of the primary form.

3. The method of forming the container of claim 2, wherein the heated fluid has a temperature between approximately 40 and 1000 degrees Fahrenheit.

4. The method of claim 1, further comprising reheating the primary form before blow molding the secondary form.

5. The method of claim 1, wherein applying the fluid includes applying the fluid via a channel defined in the primary mold.

6. The method of claim 5, wherein the primary mold includes a static portion, and wherein the channel is defined through the static portion.

7. The method of claim 5, wherein the primary mold includes a static portion and a movable portion that moves relative to the static portion, and wherein the channel is defined between the static portion and the movable portion.

8. The method of claim 5, wherein the primary mold includes a static portion and a movable portion that moves relative to the static portion, and wherein the channel is defined through the moveable portion.

9. The method of claim 8, wherein the movable portion includes at least one of a push up member and a counter stretch rod.

10. The method of claim 1, wherein the fluid is a gas.

11. The method of claim 1, wherein applying the fluid includes applying the fluid at a predetermined exterior pressure, the predetermined exterior pressure being between approximately 10 to 300 psi.

12. The method of claim 1, wherein the container is a container made of a polymeric material.

13. The method of claim 1, further comprising supplying an internal fluid into the primary form while applying the fluid to the exterior surface of the primary form.

14. The method of claim 13, wherein applying the fluid to the exterior surface includes applying the fluid to the exterior surface at a predetermined exterior pressure, wherein supplying the internal fluid into the primary form includes supplying the internal fluid into the primary form at a predetermined interior pressure, and wherein the exterior pressure is always greater than the interior pressure.

15. The method of claim 13, wherein supplying an internal fluid into the primary form includes supplying the internal fluid at an interior pressure of up to 200 psi.

16. The method of claim 13, wherein supplying an internal fluid into the primary form includes supplying the internal fluid at a temperature between approximately 40 to 1000 degrees Fahrenheit.

* * * * *